US011990071B2

(12) United States Patent
Zhao

(10) Patent No.: US 11,990,071 B2
(45) Date of Patent: May 21, 2024

(54) DISPLAY DEVICE

(71) Applicant: TCL CHINA STAR OPTOELECTRONICS TECHNOLOGY CO., LTD., Guangdong (CN)

(72) Inventor: Yizhuo Zhao, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/618,478

(22) PCT Filed: Nov. 23, 2021

(86) PCT No.: PCT/CN2021/132412
§ 371 (c)(1),
(2) Date: Dec. 12, 2021

(87) PCT Pub. No.: WO2023/087334
PCT Pub. Date: May 25, 2023

(65) Prior Publication Data

US 2024/0013691 A1 Jan. 11, 2024

(30) Foreign Application Priority Data

Nov. 16, 2021 (CN) ......................... 202111352534.7

(51) Int. Cl.
*G09G 3/20* (2006.01)

(52) U.S. Cl.
CPC ....... *G09G 3/20* (2013.01); *G09G 2320/0233* (2013.01); *G09G 2320/0247* (2013.01);
(Continued)

(58) Field of Classification Search
CPC ............. G09G 3/20; G09G 2320/0233; G09G 2320/0247; G09G 2320/0276;
(Continued)

(56) References Cited

U.S. PATENT DOCUMENTS 6,201,530 B1 * 3/2001 Thadani ................... H04N 9/69 348/E9.052
6,611,249 B1 * 8/2003 Evanicky ............. G09G 3/2092 348/E9.051
(Continued)

FOREIGN PATENT DOCUMENTS

CN 106710558 A 5/2017
CN 107358933 A 11/2017
(Continued)

OTHER PUBLICATIONS

International Search Report in International application No. PCT/CN2021/132412, dated Jul. 29, 2022.
(Continued)

*Primary Examiner* — Tom V Sheng
(74) *Attorney, Agent, or Firm* — PV IP PC Chung; Wei Te Chung; Zhigang Ma

(57) ABSTRACT

The present application discloses a display device. In the display device provided by the present application, by making the refresh frequencies correspond to the white balance look-up tables and the gamma voltages, when the refresh frequencies of the display panel change, the brightness of the images of the display panel can be adjusted by adjusting the white balance look-up table and the gamma voltage provided to the display panel.

18 Claims, 3 Drawing Sheets

(52) U.S. Cl.
CPC ............... *G09G 2320/0276* (2013.01); *G09G 2320/0626* (2013.01); *G09G 2320/0673* (2013.01); *G09G 2330/021* (2013.01); *G09G 2360/16* (2013.01)

(58) Field of Classification Search
CPC ... G09G 2320/0626; G09G 2320/0673; G09G 2330/021; G09G 2360/16
USPC .......................................................... 345/690
See application file for complete search history.

(56) References Cited

U.S. PATENT DOCUMENTS

| | | | | |
|---|---|---|---|---|
| 2012/0242680 | A1 | 9/2012 | Park | |
| 2016/0196802 | A1* | 7/2016 | Nho | G09G 3/20 345/212 |
| 2018/0240415 | A1* | 8/2018 | Chen | H04N 5/202 |
| 2019/0325828 | A1* | 10/2019 | Zhang | G09G 3/3225 |
| 2021/0027726 | A1* | 1/2021 | Lee | H04N 9/3182 |
| 2022/0036856 | A1* | 2/2022 | Chen | G09G 5/10 |
| 2022/0130308 | A1* | 4/2022 | Jung | G09G 5/10 |
| 2022/0230570 | A1* | 7/2022 | Seo | G09G 3/001 |
| 2023/0082882 | A1* | 3/2023 | Wang | G09G 3/3266 345/204 |
| 2023/0222950 | A1* | 7/2023 | Zhang | G09G 3/20 345/691 |
| 2023/0274678 | A1* | 8/2023 | Wen | G09G 3/2003 345/214 |

FOREIGN PATENT DOCUMENTS

| | | | |
|---|---|---|---|
| CN | 109616083 | A | 4/2019 |
| CN | 111540329 | A | 8/2020 |
| CN | 112542123 | A | 3/2021 |
| CN | 113077746 | A | 7/2021 |
| JP | S63308484 | A | 12/1988 |
| JP | 2005057647 | A | 3/2005 |

OTHER PUBLICATIONS

Written Opinion of the International Search Authority in International application No. PCT/CN2021/132412, dated Jul. 29, 2022.
Chinese Office Action issued in corresponding Chinese Patent Application No. 202111352534.7 dated Jan. 3, 2023, pp. 1-8.

* cited by examiner

DISPLAY DEVICE

BACKGROUND OF INVENTION

Field of Invention

The present application relates to a field of display technology, in particular to a display device.

Description of Prior Art

A display device often refreshes images at a certain fixed frequency when displaying, and under certain specific conditions, the display device is required to display at a higher or lower refresh frequency. However, a time period between two frames displayed at a lower refresh frequency is longer than a time period between two frames displayed at a higher refresh frequency. A too long time period will increase electrical leakage of a display, and ultimately reduce the overall brightness of the display. Therefore, if the display device needs to switch back and forth between different refresh frequencies in a short time period, a difference in the brightness of the display device under different refresh frequencies will cause serious flicker on the display.

SUMMARY OF INVENTION

The present application provides a display device to solve the technical problem that in the existing display device, if the display device needs to switch back and forth between different refresh frequencies in a short time period, the difference in the brightness of the display device under different refresh frequencies will cause serious flicker on the display.

In a first aspect, the present application provides a display device, which includes a display panel, a driving module, a first power control module, and a second power control module;

- wherein the driving module is configured to transmit a driving signal to the display panel to control the display panel to refresh images at different refresh frequencies;
- wherein the first power control module is configured to call white balance look-up tables corresponding to the refresh frequencies of the display panel according to the refresh frequencies of the display panel, so that the display panel displays the images with preset brightness while refreshing the images at the different refresh frequencies;
- wherein the second power control module is configured to provide gamma voltages corresponding to the refresh frequencies of the display panel to the display panel when the refresh frequencies of the display panel are switched, so as to reduce a brightness difference when the display panel refreshes the images at the different refresh frequencies;
- wherein the first power control module includes a first control unit and a first power management unit;
- wherein the driving module is also configured to transmit a first enable signal to the first control unit when transmitting the driving signal to the display panel;
- the first control unit is configured to determine the refresh frequencies of the display panel according to the first enable signal; and the first power management unit is configured to call the white balance look-up tables corresponding to the refresh frequencies of the display panel according to the refresh frequencies of the display panel;

- wherein the second voltage module includes a second control unit and a second power management unit; and
- wherein the driving module is also configured to transmit a second enable signal to the second control unit when transmitting the driving signal to the display panel; the second control unit is configured to determine whether the refresh frequencies of the display panel are switched according to the second enable signal; and the first power management unit is configured to provide the display panel with the gamma voltages corresponding to the refresh frequencies of the display panel according to the refresh frequencies of the display panel.

In the display device provided by the present application, the display device stores a plurality of the white balance look-up tables; wherein the plurality of white balance look-up tables are set in a one-to-one correspondence with a plurality of refresh frequency intervals.

In the display device provided by the present application, a time period required for switching between different ones of the white balance look-up tables is a time period of at least two frames.

In the display device provided by the present application, the time period required for switching between different ones of the white balance look-up tables is at least a time period including a first frame time and a second frame time; and

- wherein within the first frame time, the display device detects the refresh frequencies of the display device; and within the second frame time, the display device loads corresponding ones of the white balance look-up tables.

In the display device provided by the present application, the second power control module is configured to provide the display panel with the gamma voltages corresponding to the refresh frequencies of the display panel within the second frame time to reduce the brightness difference when the display panel refreshes the images at the different refresh frequencies.

In the display device provided by the present application, when the display device is switched from a first refresh frequency to a second refresh frequency, within the first frame time and the second frame time, the first power control module calls a white balance look-up table corresponding to the first refresh frequency.

In the display device provided by the present application, when the display device is switched from a first refresh frequency to a second refresh frequency, before the first frame time, the first power control module calls a white balance look-up table corresponding to the first refresh frequency.

In the display device provided by the present application, when the display device is switched from a first refresh frequency to a second refresh frequency, after the second frame time, the first power control module calls a white balance look-up table corresponding to the second refresh frequency.

In a second aspect, the present application provides a display device, which includes a display panel, a driving module, a first power control module, and a second power control module;

- wherein the driving module is configured to transmit a driving signal to the display panel to control the display panel to refresh images at different refresh frequencies;
- wherein the first power control module is configured to call white balance look-up tables corresponding to the refresh frequencies of the display panel according to the refresh frequencies of the display panel, so that the display panel displays the images with preset brightness while refreshing the images at the different refresh frequencies;

wherein the second power control module is configured to provide gamma voltages corresponding to the refresh frequencies of the display panel to the display panel when the refresh frequencies of the display panel are switched, so as to reduce a brightness difference when the display panel refreshes the images at the different refresh frequencies;

In the display device provided by the present application, the display device stores a plurality of the white balance look-up tables; wherein the plurality of white balance look-up tables are set in a one-to-one correspondence with a plurality of refresh frequency intervals.

In the display device provided by the present application, a time period required for switching between different ones of the white balance look-up tables is a time period of at least two frames.

In the display device provided by the present application, the time period required for switching between different ones of the white balance look-up tables is at least a time period including a first frame time and a second frame time; and wherein within the first frame time, the display device detects the refresh frequencies of the display device; and within the second frame time, the display device loads corresponding ones of the white balance look-up tables.

In the display device provided by the present application, the second power control module is configured to provide the display panel with the gamma voltages corresponding to the refresh frequencies of the display panel within the second frame time to reduce the brightness difference when the display panel refreshes the images at the different refresh frequencies.

In the display device provided by the present application, when the display device is switched from a first refresh frequency to a second refresh frequency, within the first frame time and the second frame time, the first power control module calls a white balance look-up table corresponding to the first refresh frequency.

In the display device provided by the present application, when the display device is switched from a first refresh frequency to a second refresh frequency, before the first frame time, the first power control module calls a white balance look-up table corresponding to the first refresh frequency.

In the display device provided by the present application, when the display device is switched from a first refresh frequency to a second refresh frequency, after the second frame time, the first power control module calls a white balance look-up table corresponding to the second refresh frequency.

In the display device provided by the present application, the first power control module includes a first control unit and a first power management unit;

wherein the driving module is also configured to transmit a first enable signal to the first control unit when transmitting the driving signal to the display panel;

the first control unit is configured to determine the refresh frequencies of the display panel according to the first enable signal; and the first power management unit is configured to call the white balance look-up tables corresponding to the refresh frequencies of the display panel according to the refresh frequencies of the display panel;

In the display device provided by the present application, the second voltage module includes a second control unit and a second power management unit; and wherein the driving module is also configured to transmit a second enable signal to the second control unit when transmitting the driving signal to the display panel; the second control unit is configured to determine whether the refresh frequencies of the display panel are switched according to the second enable signal; and the first power management unit is configured to provide the display panel with the gamma voltages corresponding to the refresh frequencies of the display panel according to the refresh frequencies of the display panel.

In the display device provided by the present application, by making the refresh frequencies correspond to the white balance look-up tables and the gamma voltages, when the refresh frequencies of the display panel change, the brightness of the images of the display panel can be adjusted by adjusting the white balance look-up table and the gamma voltage provided to the display panel, and by increasing the brightness of the images of the display panel when the display panel refreshes the images at a lower refresh frequency, or/and pulling down the brightness of the images of the display panel when the display panel refreshes the images at a higher refresh frequency, the brightness difference between the images of the display panel refreshed at a lower refresh frequency and the images of the display panel refreshed at a higher refresh frequency is improved, so that the display panel displays the images with a constant brightness when the images are refreshed at different refresh frequencies, thereby preventing the display device from serious flicker on the display when switching back and forth between different refresh frequencies in a short time period.

BRIEF DESCRIPTION OF DRAWINGS

In order to more clearly illustrate the technical solutions of the embodiments of the present application, the drawings illustrating the embodiments will be briefly described below. Obviously, the drawings in the following description merely illustrate some embodiments of the present invention. Other drawings may also be obtained by those skilled in the art according to these figures without paying creative work.

DETAILED DESCRIPTION OF PREFERRED EMBODIMENTS

The technical solutions in the embodiments of the present application will be clearly and completely described in the following with reference to the accompanying drawings in the embodiments. It is apparent that the described embodiments are only a part of the embodiments of the present application, and not all of them. All other embodiments obtained by a person skilled in the art based on the embodiments of the present application without creative efforts are within the scope of the present application. In addition, it should be understood that the specific implementations described here are only used to illustrate and explain the present application, and are not used to limit the present application. The terms "first", "second", etc. in the claims of the present application and the specification are used to distinguish different objects, rather than to describe a specific order.

The present application is directed to solve the technical problem of serious flickering of the display device due to the brightness difference of the display device under different refresh frequencies if the display device needs to switch back and forth between different refresh frequencies in a short time in the existing display device.

In view of this, in the display device provided by the present application, by making the refresh frequencies correspond to the white balance look-up tables and the gamma voltages, when the refresh frequencies of the display panel change, the brightness of the images of the display panel can be adjusted by adjusting the white balance look-up table and the gamma voltage provided to the display panel, and by increasing the brightness of the images of the display panel when the display panel refreshes the images at a lower refresh frequency, or/and pulling down the brightness of the images of the display panel when the display panel refreshes the images at a higher refresh frequency, the brightness difference between the images of the display panel refreshed at a lower refresh frequency and the images of the display panel refreshed at a higher refresh frequency is improved, so that the display panel displays the images with a constant brightness when the images are refreshed at different refresh frequencies, thereby preventing the display device from serious flicker on the display when switching back and forth between different refresh frequencies in a short time period.

Figure 1:
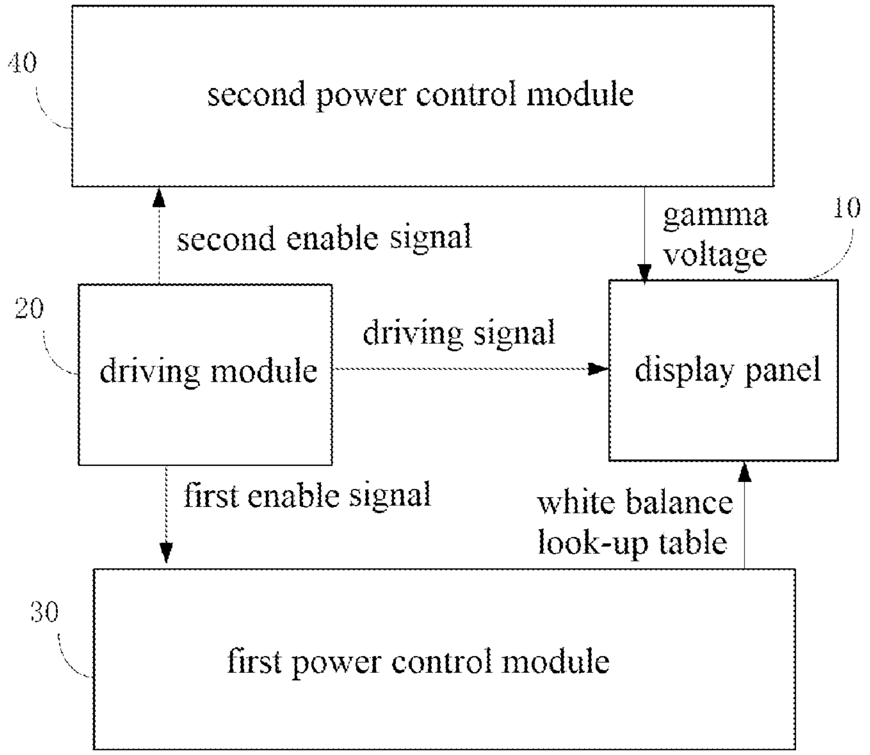
FIG. 1 is a schematic structural diagram of a display device provided by an embodiment of the present application.

Referring to FIG. 1, FIG. 1 is a schematic structural diagram of a display device provided by an embodiment of the present application. As shown in FIG. 1, the display device provided by an embodiment of the present application includes a display panel 10, a driving module 20, a first power control module 30, and a second power control module 40. The display device is a display device equipped with Free Sync (image adaptive synchronization) technology.

The driving module 20 is connected to the display panel 10, the first power control module 30 and the second power control module 40. The driving module 10 is configured to transmit a driving signal to the display panel 10 to control the display panel 10 to refresh images at different refresh frequencies. The first power control module 30 is connected to the display panel 10. The first power control module 30 is configured to call white balance look-up table corresponding to the refresh frequencies of the display panel 10 according to the refresh frequencies of the display panel 10, so that the display panel 10 displays the images with preset brightness while refreshing the images at the different refresh frequencies. The second power control module 40 is connected to the display panel 10. The second power control module 40 is configured to provide the display panel 10 with gamma voltages corresponding to the refresh frequencies of the display panel 10 when the display panel 10 is switching the refresh frequencies, so as to reduce the brightness difference when the display panel 10 refreshes images at different refresh frequencies.

It should be noted that the drive module 20 may be an image drive board (Timer Control Register, TCON), and the driving module 20 transmits driving signals to components such as the source driver and the scan driver of the display panel 10 for controlling the source driver, the scan driver, and so on to drive the display panel 10.

Further, the driving module 20 is also configured to transmit a first enable signal to the first power control module 30 and a second enable signal to the second power control module 40 when transmitting a driving signal to the display panel 10. The first power control module 30 determines the refresh frequencies of the display panel 10 according to the first enable signal, and calls the white balance look-up table corresponding to the refresh frequencies of the display panel 10 according to the refresh frequencies of the display panel 10. The second power control module 40 determines whether the display panel 10 performs refresh frequency switching according to the second enable signal, and provides the display panel 10 with gamma voltages corresponding to the refresh frequencies of the display panel 10 according to the refresh frequencies of the display panel 10.

It should be noted that the refresh frequencies refers to speeds at which the images are refreshed on a screen when the display panel 10 is working, that is, a number of times the images appear on the screen per second. For example, if the images appears 60 times per second, the refresh frequencies is 60 Hz.

It is appreciated that when the refresh frequencies, the white balance look-up tables, and the gamma voltages change corresponding to the refresh frequencies of the display panel 10, the brightness of the images display of the display panel can be adjusted by adjusting the called white balance look-up tables and the gamma voltages provided to the display panel 10. For example, the refresh frequencies of the display panel 10 at the nth frame is 70 Hz, and at this time the first power control module 30 calls a white balance look-up table, and the second power control module 40 provides the display panel 10 with a gamma voltage of 10V. The refresh frequencies of the display panel 10 is switched to 60 Hz at the n+1th frame. At this time, the first power control module 30 calls another white balance look-up table, and the second power control module 40 provides the display panel 10 with a gamma voltage of 12V, thereby by increasing the brightness of the images of the display panel 10 when the display panel refreshes the images at a lower refresh frequency, or/and pulling down the brightness of the images of the display panel when the display panel refreshes the images at a higher refresh frequency, so that the display panel 10 displays the images with a constant brightness when the images are refreshed at both a lower refresh frequency and a higher refresh frequency, thereby preventing the display device 10 from serious flicker on the display when switching back and forth between different refresh frequencies in a short time period.

Figure 2:
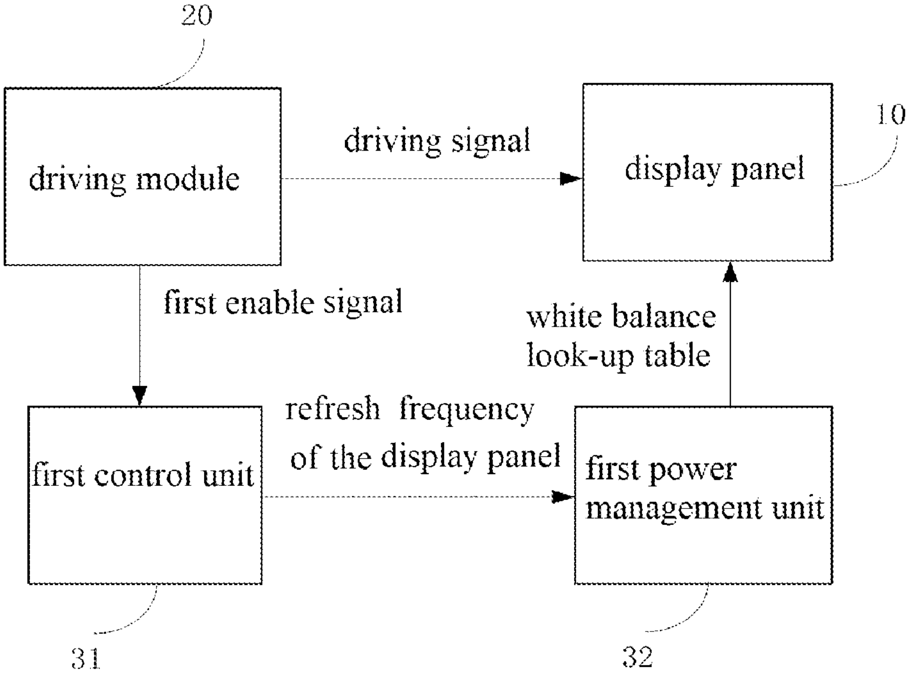
FIG. 2 is a schematic structural diagram of a first power control module in a display device provided by an embodiment of the present application.

Referring to FIG. 2, FIG. 2 is a schematic structural diagram of a first power control module in a display device provided by an embodiment of the present application. As shown in FIGS. 1 and 2, the first power control module 30 includes a first control unit 31 and a first power management unit 32. The first control unit 31 may be a complex programmable logic device (CPLD). The first power management unit 32 may be a power management integrated circuit (PMIC).

The driving module 20 is also configured to transmit a first enable signal to the first control unit 31 when transmitting a driving signal to the display panel 10. The first control unit 31 is configured to determine the refresh frequencies of the display panel 10 according to the first enable signal. The first power management unit 32 is configured to call white balance look-up tables corresponding to the refresh frequencies of the display panel 10 according to the refresh frequencies of the display panel 10.

Figure 3:
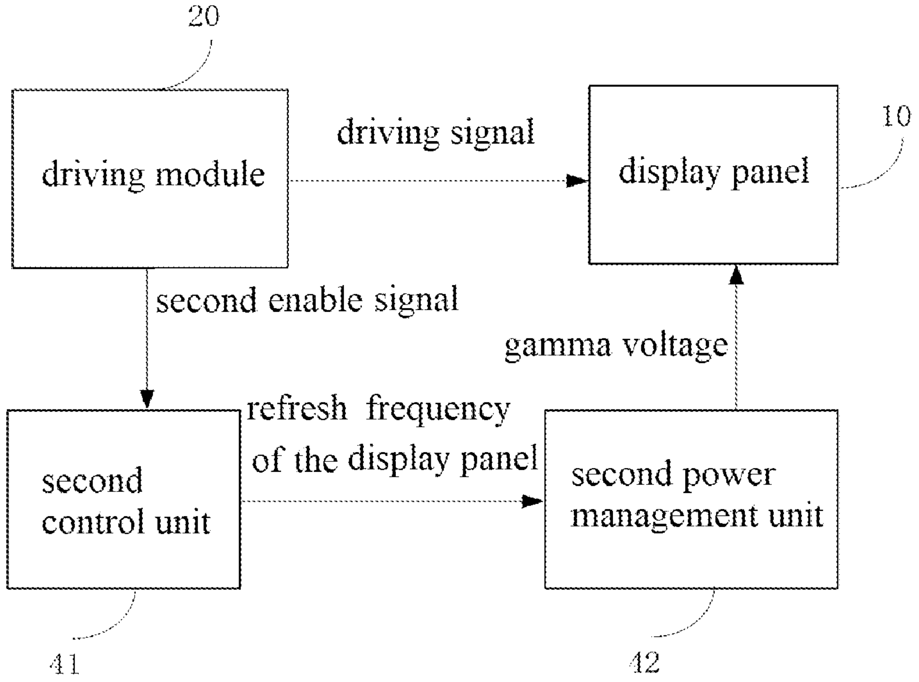
FIG. 3 is a schematic structural diagram of a second power control module in a display device according to an embodiment of the present application.

Referring to FIG. 3, FIG. 3 is a schematic structural diagram of the second power control module in the display device according to an embodiment of the present application. As shown in FIGS. 1 and 3, the second power control module 40 includes a second control unit 41 and a second power management unit 42. The second control unit 41 may be a complex programmable logic device (CPLD). The second power management unit 42 may be a power management integrated circuit (PMIC).

The driving module 20 is also configured to transmit a second enable signal to the second control unit 41 when transmitting a driving signal to the display panel 10. The second control unit 41 is configured to determine whether the refresh frequencies of the display panel 10 are switched according to the second enable signal. The first power management unit 42 is configured to provide the display panel 10 with gamma voltages corresponding to the refresh frequencies of the display panel 10 according to the refresh frequencies of the display panel 10.

Figure 4:
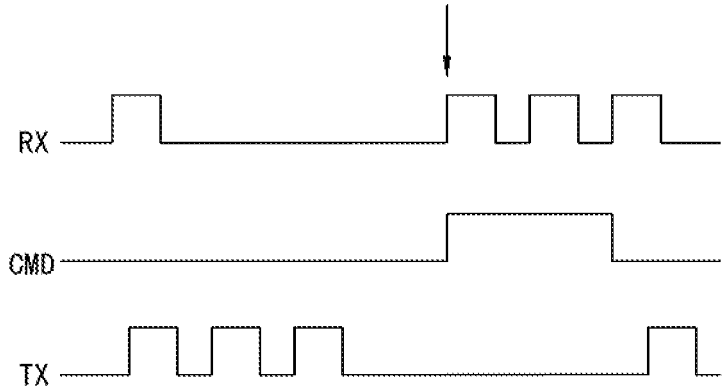
FIG. 4 is a signal schematic diagram of an enable signal and a control signal when refresh frequencies are switched in the display device provided by an embodiment of the present application.

It is appreciated that, referring to FIG. 4, FIG. 4 is a signal schematic diagram of an enable signal and a control signal when refresh frequencies are switched in the display device provided by an embodiment of the present application. As shown in FIG. 1, FIG. 2, FIG. 3, and FIG. 4, each of the first enable signal and the second enable signal transmitted by the drive module includes a first input signal RX and a second input signal TX. The first input signal RX represents a data enable signal input by a front end to each row of the drive module, and the second input signal TX represents a data enable signal input by the drive module to each row of the source driver of the display panel. The refresh frequencies of the display panel can be determined based on a time period between two of the first input signals RX or a time period between two of the second input signals TX, so that it can be detected whether the refresh frequencies of the display panel has changed.

It should be noted that in the embodiment of the present application, the display device stores a plurality of the white balance look-up tables; wherein the plurality of white balance look-up tables are set in a one-to-one correspondence with a plurality of refresh frequency intervals. A time period required for switching between different ones of the white balance look-up tables is at least a time period of at least two frames.

The time period required for switching between different ones of the white balance look-up tables is at least a time period including a first frame time and a second frame time; within the first frame time, the display device detects the refresh frequencies of the display device; and within the second frame time, the display device loads corresponding ones of the white balance look-up tables the second power control module is configured to provide the display panel with the gamma voltages corresponding to the refresh frequencies of the display panel within the second frame time to reduce the brightness difference when the display panel refreshes the images at the different refresh frequencies.

When the display device is switched from a first refresh frequency to a second refresh frequency, within the first frame time and the second frame time, the first power control module calls a white balance look-up table corresponding to the first refresh frequency. When the display device is switched from a first refresh frequency to a second refresh frequency, before the first frame time, the first power control module calls a white balance look-up table corresponding to the first refresh frequency. When the display device is switched from a first refresh frequency to a second refresh frequency, after the second frame time, the first power control module calls a white balance look-up table corresponding to the second refresh frequency.

Figure 5:
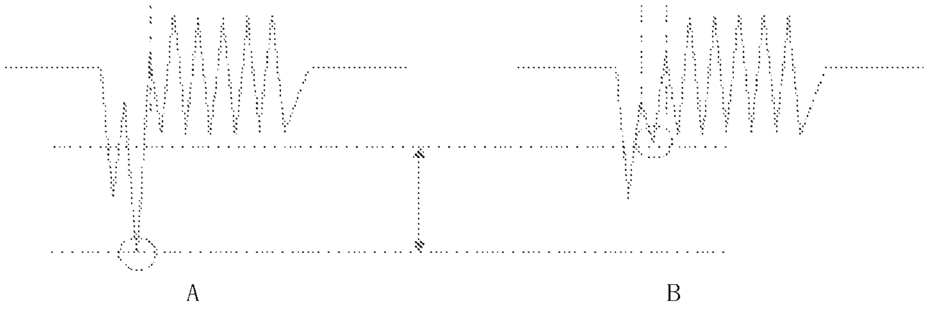
FIG. 5 is a schematic diagram of effects of the display device provided by an embodiment of the present application.

Referring to FIG. 5, FIG. 5 is a schematic diagram of effects of the display device provided by an embodiment of the present application. Referring to FIG. 1 in conjunction with FIG. 5, when the display device is only provided with the first power control module, and not the second power control module, a brightness waveform is shown in part A in FIG. 5; and when the display device is provided with both the first power control module and the second power control module, a brightness waveform is shown in part B in FIG. 5.

A white balance can be used to adjust color temperature performance of the display device by separately controlling a mapping relationship of gray levels of R, G, and B, and can also be used to adjust the brightness of the images. In the embodiments of the present application, different white balance look-up tables may be used at different refresh frequencies, so that the brightness of the display device remains consistent at different refresh frequencies. However, when the white balance look-up tables are switched, it takes a time period of two or more frames. Because a time period of at least one frame is required for refresh frequency detection, and a time period of at least another one frame is required for white balance look-up table loading, it will result in that the white balance look-up tables used in at least first two frames after switching at different frequencies are still the white balance look-up tables before switching, which will cause a drastic brightness jump, thereby degrading a flicker performance, as shown in part A in FIG. 5. In view of this, in an embodiment of the present application, the gamma voltages corresponding to the refresh frequencies of the display panel can be provided to the display panel when the refresh frequencies of the display panel are switched, so as to reduce the brightness difference when the display panel refreshes the images at the different refresh frequencies, as shown in Part B of FIG. 5.

In the display device provided by the present application, by making the refresh frequencies correspond to the white balance look-up tables and the gamma voltages, when the refresh frequencies of the display panel change, the brightness of the images of the display panel can be adjusted by adjusting the white balance look-up table and the gamma voltage provided to the display panel, and by increasing the brightness of the images of the display panel when the display panel refreshes the images at a lower refresh frequency, or/and pulling down the brightness of the images of the display panel when the display panel refreshes the images at a higher refresh frequency, the brightness difference between the images of the display panel refreshed at a lower refresh frequency and the images of the display panel refreshed at a higher refresh frequency is improved, so that the display panel displays the images with a constant brightness when the images are refreshed at different refresh frequencies, thereby preventing the display device from serious flicker on the display when switching back and forth between different refresh frequencies in a short time period.

The display device provided by the embodiments of the present application are described in detail above. Specific examples are used to explain the principle and implementation of the present application. The descriptions of the above embodiments are only used to help understand the present application. Also, for those skilled in the art, according to the ideas of the present application, there will be changes in the specific implementation and application scope. In summary, the content of this specification should not be construed as limiting the present application.

What is claimed is:

1. A display device, comprising a display panel, a driving module, a first power control module, and a second power control module;

wherein the driving module is configured to transmit a driving signal to the display panel to control the display panel to refresh images at different refresh frequencies;

wherein the first power control module is configured to call white balance look-up tables corresponding to the refresh frequencies of the display panel according to the refresh frequencies of the display panel, so that the display panel displays the images with preset brightness while refreshing the images at the different refresh frequencies;

wherein the second power control module is configured to provide gamma voltages corresponding to the refresh frequencies of the display panel to the display panel when the refresh frequencies of the display panel are switched, so as to reduce a brightness difference when the display panel refreshes the images at the different refresh frequencies;

wherein the first power control module comprises a first control unit and a first power management unit;

wherein the driving module is also configured to transmit a first enable signal to the first control unit when transmitting the driving signal to the display panel; the first control unit is configured to determine the refresh frequencies of the display panel according to the first enable signal; and the first power management unit is configured to call the white balance look-up tables corresponding to the refresh frequencies of the display panel according to the refresh frequencies of the display panel;

wherein the second voltage module comprises a second control unit and a second power management unit; and wherein the driving module is also configured to transmit a second enable signal to the second control unit when transmitting the driving signal to the display panel; the second control unit is configured to determine whether the refresh frequencies of the display panel are switched according to the second enable signal; and the second power management unit is configured to provide the display panel with the gamma voltages corresponding to the refresh frequencies of the display panel according to the refresh frequencies of the display panel.

2. The display device according to claim 1, wherein the display device stores a plurality of the white balance look-up tables; wherein the plurality of white balance look-up tables are set in a one-to-one correspondence with a plurality of refresh frequency intervals.

3. The display device according to claim 2, wherein a time period required for switching between different ones of the white balance look-up tables is a time period of at least two frames.

4. The display device according to claim 3, wherein the time period required for switching between different ones of the white balance look-up tables is at least a time period including a first frame time and a second frame time; and wherein within the first frame time, the display device detects the refresh frequencies of the display device; and within the second frame time, the display device loads corresponding ones of the white balance look-up tables.

5. The display device according to claim 4, wherein the second power control module is configured to provide the display panel with the gamma voltages corresponding to the refresh frequencies of the display panel within the second frame time to reduce the brightness difference when the display panel refreshes the images at the different refresh frequencies.

6. The display device according to claim 4, wherein when the display device is switched from a first refresh frequency to a second refresh frequency, within the first frame time and the second frame time, the first power control module calls a white balance look-up table corresponding to the first refresh frequency.

7. The display device according to claim 4, wherein when the display device is switched from a first refresh frequency to a second refresh frequency, before the first frame time, the first power control module calls a white balance look-up table corresponding to the first refresh frequency.

8. The display device according to claim 4, wherein when the display device is switched from a first refresh frequency to a second refresh frequency, after the second frame time, the first power control module calls a white balance look-up table corresponding to the second refresh frequency.

9. A display device, comprising a display panel, a driving module, a first power control module, and a second power control module;

wherein the driving module is configured to transmit a driving signal to the display panel to control the display panel to refresh images at different refresh frequencies;

wherein the first power control module is configured to call white balance look-up tables corresponding to the refresh frequencies of the display panel according to the refresh frequencies of the display panel, so that the display panel displays the images with preset brightness while refreshing the images at the different refresh frequencies;

wherein the second power control module is configured to provide gamma voltages corresponding to the refresh frequencies of the display panel to the display panel when the refresh frequencies of the display panel are switched, so as to reduce a brightness difference when the display panel refreshes the images at the different refresh frequencies.

10. The display device according to claim 9, wherein the display device stores a plurality of the white balance look-up tables; wherein the plurality of white balance look-up tables are set in a one-to-one correspondence with a plurality of refresh frequency intervals.

11. The display device according to claim 10, wherein a time period required for switching between different ones of the white balance look-up tables is a time period of at least two frames.

12. The display device according to claim 11, wherein the time period required for switching between different ones of the white balance look-up tables is at least a time period including a first frame time and a second frame time; and wherein within the first frame time, the display device detects the refresh frequencies of the display device;

and within the second frame time, the display device loads corresponding ones of the white balance look-up tables.

13. The display device according to claim 12, wherein the second power control module is configured to provide the display panel with the gamma voltages corresponding to the refresh frequencies of the display panel within the second frame time to reduce the brightness difference when the display panel refreshes the images at the different refresh frequencies.

14. The display device according to claim 12, wherein when the display device is switched from a first refresh frequency to a second refresh frequency, within the first frame time and the second frame time, the first power control module calls a white balance look-up table corresponding to the first refresh frequency.

15. The display device according to claim 12, wherein when the display device is switched from a first refresh frequency to a second refresh frequency, before the first frame time, the first power control module calls a white balance look-up table corresponding to the first refresh frequency.

16. The display device according to claim 12, wherein when the display device is switched from a first refresh frequency to a second refresh frequency, after the second frame time, the first power control module calls a white balance look-up table corresponding to the second refresh frequency.

17. The display device according to claim 9, wherein the first power control module comprises a first control unit and a first power management unit;

wherein the driving module is also configured to transmit a first enable signal to the first control unit when transmitting the driving signal to the display panel; the first control unit is configured to determine the refresh frequencies of the display panel according to the first enable signal; and the first power management unit is configured to call the white balance look-up tables corresponding to the refresh frequencies of the display panel according to the refresh frequencies of the display panel.

18. The display device according to claim 9, wherein the second voltage module comprises a second control unit and a second power management unit; and wherein the driving module is also configured to transmit a second enable signal to the second control unit when transmitting the driving signal to the display panel; the second control unit is configured to determine whether the refresh frequencies of the display panel are switched according to the second enable signal; and the first power management unit is configured to provide the display panel with the gamma voltages corresponding to the refresh frequencies of the display panel according to the refresh frequencies of the display panel.

* * * * *